Aug. 31, 1943.  G. D. LEA ET AL  2,328,383
ARTICLE HANDLING APPARATUS
Filed July 8, 1941   3 Sheets-Sheet 1
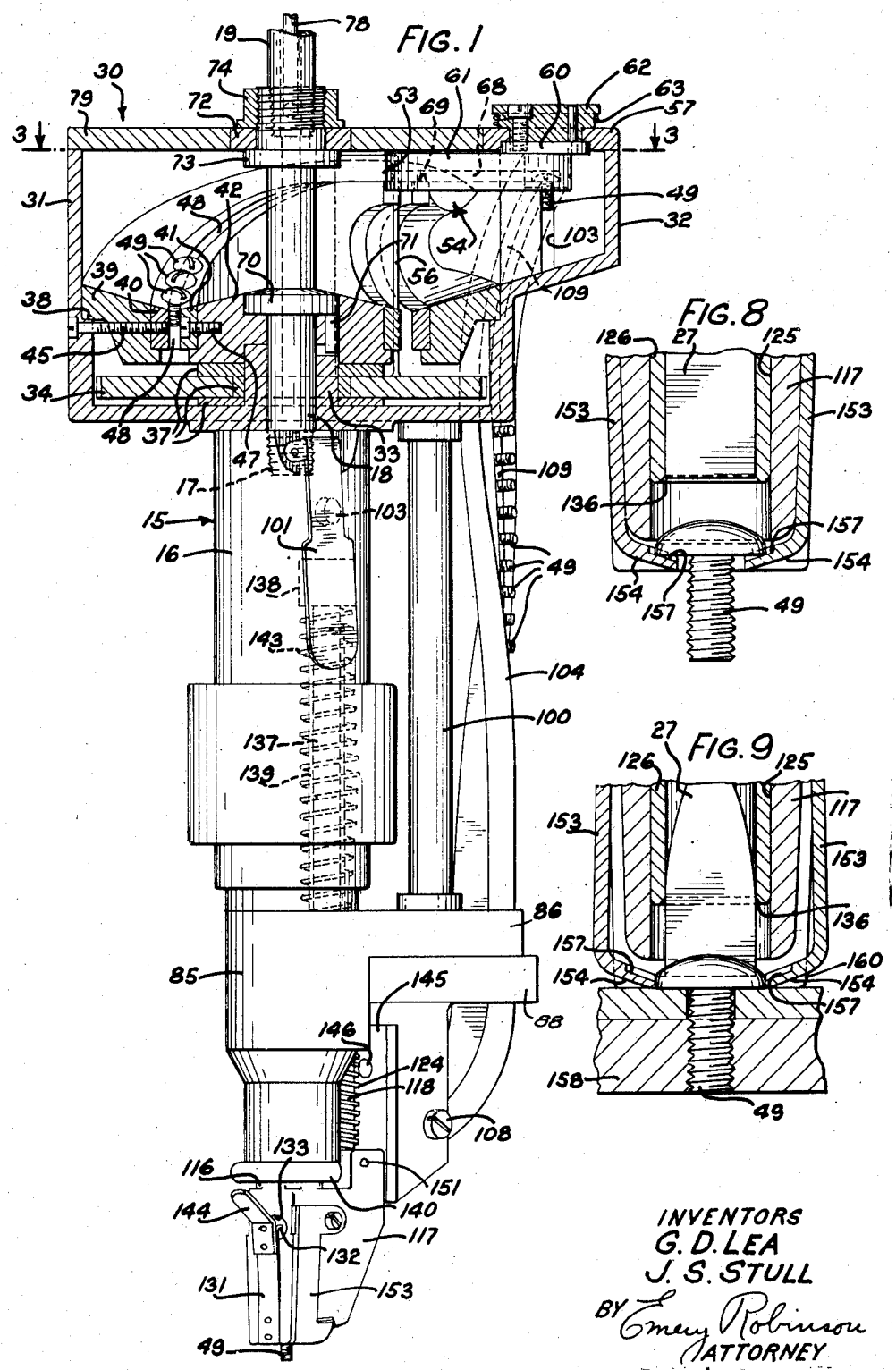
INVENTORS
G. D. LEA
J. S. STULL
BY Emery Robinson
ATTORNEY Aug. 31, 1943.  G. D. LEA ET AL  2,328,383
ARTICLE HANDLING APPARATUS
Filed July 8, 1941  3 Sheets-Sheet 2
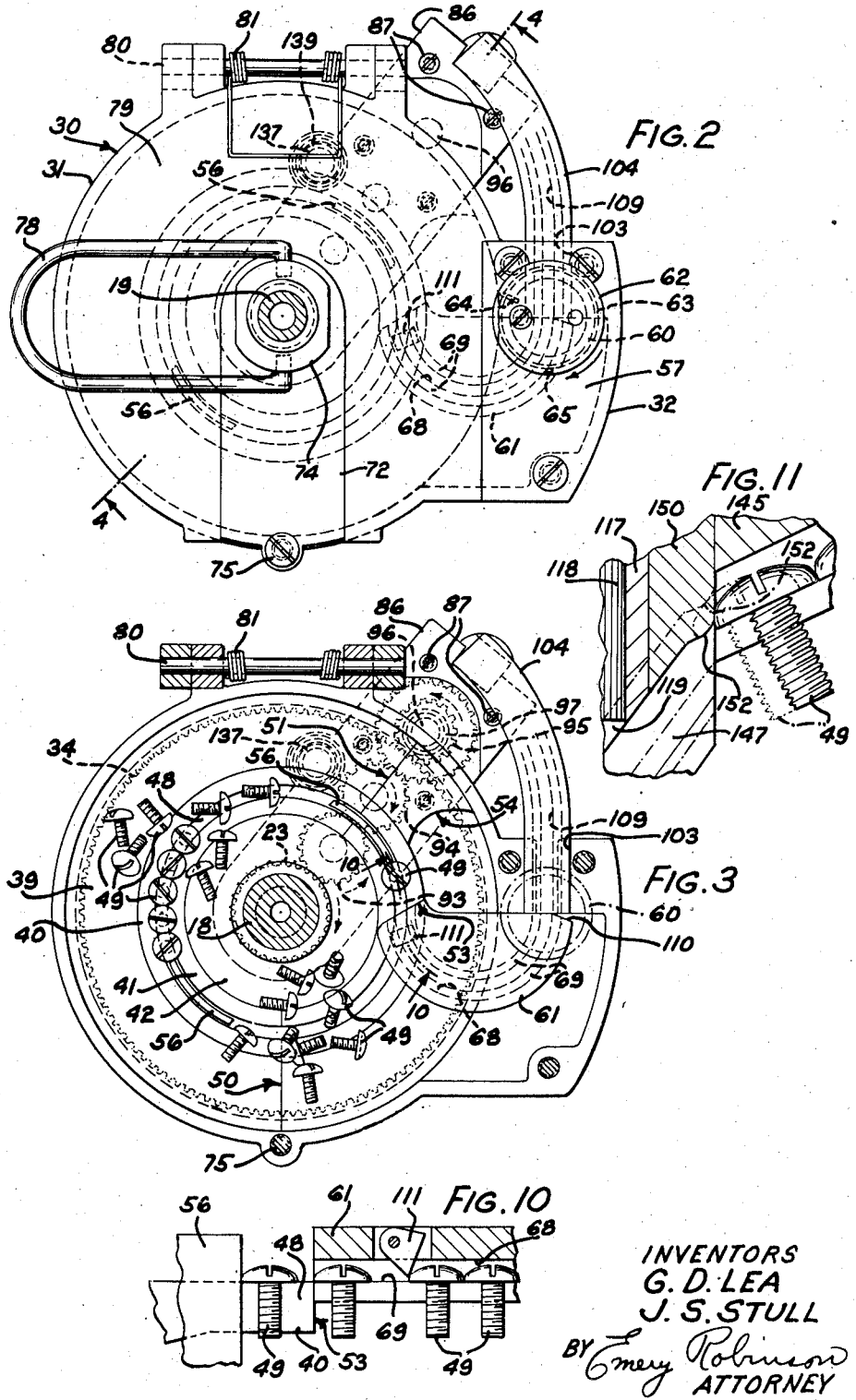
INVENTORS
G. D. LEA
J. S. STULL
BY Emery Robinson
ATTORNEY

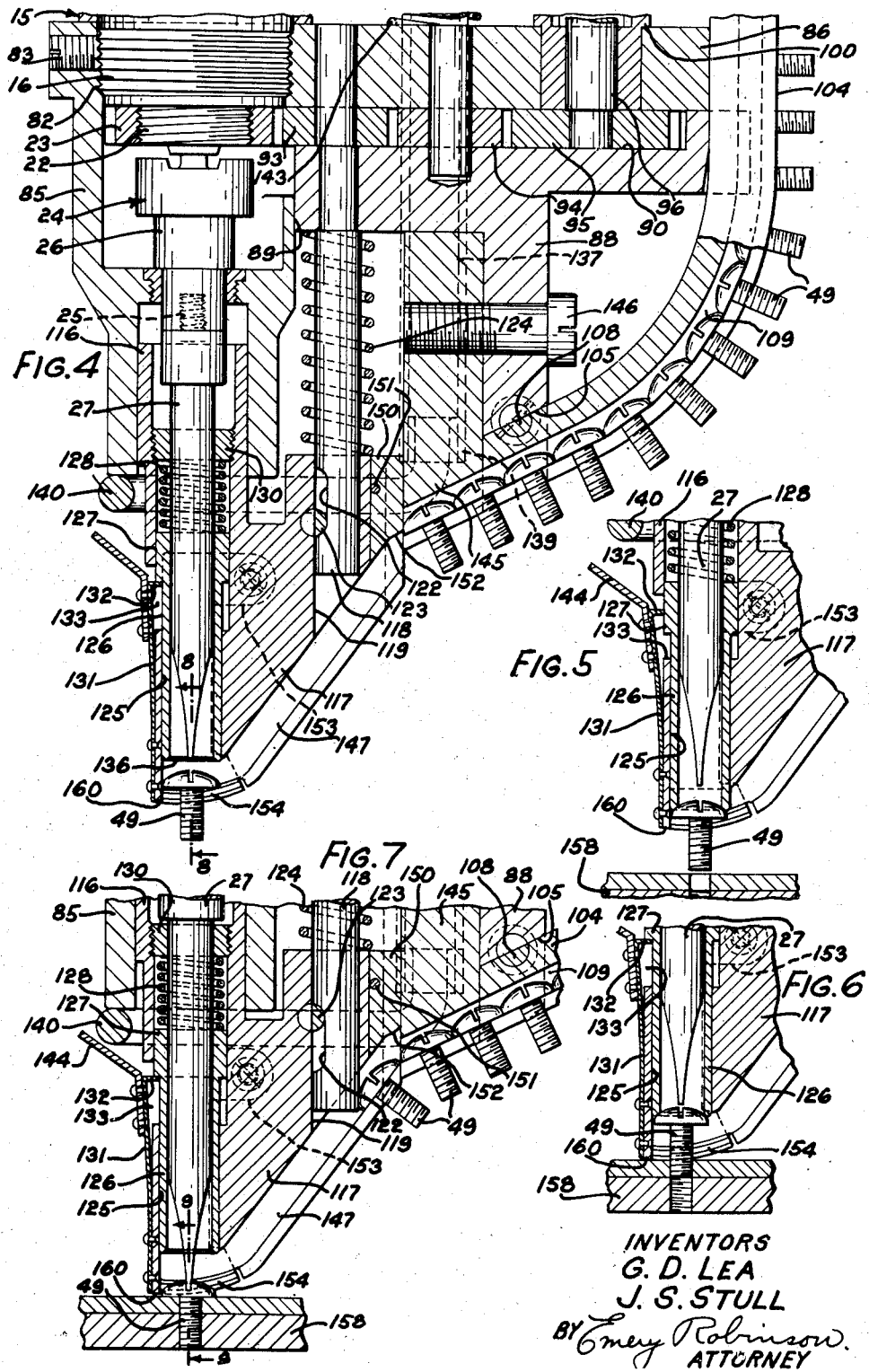

Patented Aug. 31, 1943

2,328,383

UNITED STATES PATENT OFFICE 2,328,383

ARTICLE HANDLING APPARATUS

George D. Lea, Downers Grove, and John S. Stull, Chicago, Ill., assignors to Western Electric Company, Incorporated, New York, N. Y., a corporation of New York Application July 8, 1941, Serial No. 401,482

5 Claims. (Cl. 144—32)

This invention relates to article handling apparatus and more particularly to a power driven screw feeding and driving apparatus.

An object of the invention is to provide a generally improved power driven screw feeding and driving apparatus of a portable hand controlled type, which is effective, efficient, and easily handled and operated.

In accordance with one embodiment of the invention, an apparatus is provided which includes a hopper having revolving blades for feeding screws to an attached magazine runway along which the screws gravitate to an escapement mechanism. The escapement mechanism is automatically operated to release a screw after each driving operation as the apparatus is raised from the work, the released screw freely moving onto yieldable supporting means in coaxial alignment with a screw driving blade, whereat the screw is loosely supported until the operator presses a thumb rod, which releases a latchable spring pressed sleeve surrounding the blade, which springs down against the top of the screw at its peripheral edge and holds it steady to facilitate the aligning of the screw shank with and its insertion in a receiving aperture in the work. The sleeve is automatically relatched, just prior to the engagement of the screw driving blade with the head of the screw, as the apparatus is moved downwardly, in pressing the screw shank into the receiving aperture. The apparatus includes a hand controlled pneumatic motor for driving the screw driving and hopper blades.

Other objects and advantages of this invention will more fully appear from the following detailed description, taken in conjunction with the accompanying drawings, in which Fig. 1 is an elevational view, partly in section, of a screw feeding and driving apparatus embodying the features of this invention;

Fig. 2 is a plan view thereof;

Fig. 3 is a plan section taken on the line 3—3 of Fig. 1;

Fig. 4 is an enlarged fragmentary vertical section taken on the line 4—4 of Fig. 2 showing the apparatus in its normal position ready to be lowered to drive a screw;

Fig. 5 is a partial view, similar to Fig. 4, showing the latchable spring pressed screw holding sleeve released and engaging a screw about to be driven into apertured work positioned thereunder;

Fig. 6 is a partial view, similar to Fig. 5, showing the screw shank being pressed into the apertured work during which the screw holding sleeve was relatched;

Fig. 7 is a partial view, similar to Fig. 4, showing the screw driven into the work and the escapement mechanism ready to release a screw for the next driving operation when the apparatus is raised from the work;

Figs. 8 and 9 are enlarged vertical detail sectional views taken on the lines 8—8 and 9—9 of Figs. 4 and 7, respectively;

Fig. 10 is an enlarged vertical detail sectional view taken on the line 10—10 of Fig. 3; and Fig. 11 is a fragmentary enlarged detail view of the escapement mechanism shown in Fig. 4.

The apparatus embodying the features of this invention is of a unitary pneumatically driven portable hand type, which may be yieldably suspended above a work bench in a manner (not shown) well known in the art, the operator controlling the bodily movement of the apparatus to the work and its operation with one hand.

Referring to the drawings, particularly to Figs. 1 and 4, the numeral 15 indicates a pneumatic motor of a standard commercial type having a housing 16, into the upper end of which is axially screw threaded, as indicated at 17 (Fig. 1), an externally multiple shouldered air supply pipe 18 having screw threaded into its upper end a nipple 19, which may be connected to a suitable air pressure supply source by a flexible hose (not shown). Extending axially from the lower end of the housing 16 (Fig. 4) is a motor rotor 22, onto the periphery of which is screw threaded a driving pinion 23. A usual type of toothed slip clutch, indicated, in general, at 24, functions to prevent further rotation of a driven screw when the screw is fully seated. Removably attached, at 25, to a driven portion 26 of the clutch 24, is a screw driver blade 27. A detailed description and illustration of the motor 15 has been omitted from this disclosure for the sake of simplicity, since it forms no part of this invention and is not necessary to a complete understanding thereof. For a detailed disclosure of a motor of the general type indicated a 15, reference may be had to United States Patent No. 2,099,280 to E. H. Shaff, of November 16, 1937.

Upon the upper end of the motor housing 16, surrounding the pipe 18, is a screw supply hopper, indicated, in general, at 30, comprising a cylindrical housing portion 31 having an offset portion 32. Rotatably journaled in the housing 31 upon an integral sleeve portion 33, extending upwardly from the bottom wall of the housing and surrounding the pipe 18, is a gear 34, which is driven from the driving pinion 23, hereinbefore mentioned, through a train of gears, to be referred to hereinafter. Bearings are indicated at 37. Carried in the housing 31 and supported upon the upper end surface of the sleeve portion 33 and a shoulder 38 on the inner peripheral wall of the housing are four irregularly shaped ring members 39, 40, 41 and 42 concentrically arranged about the pipe 18. The housing 31 and members 39 and 40 are held together at a plurality of points, one of which is indicated at 45. The members 41 and 42 are likewise held together, as indicated at 47 (Fig. 1). The opposed vertical faces of the members 40 and 41 are spaced apart a required distance to form an endless slot or runway 48, to freely receive the shank of a particular size screw 49, which is to be handled and fed by the apparatus, the bottom surface of the screw head being supported on the upper edge faces of the rings 40 and 41. When a screw of a different shank diameter is to be handled, the slot 48 may be changed by removing one set of rings 40 and 41 and mounting another set, which will provide the desired space therebetween.

The upper edge faces of each set of spaced ring members 39 and 40 and 41 and 42 are reversely inclined (Fig. 1) to slope toward the slot 48 and the upper faces of the ring members 39, 40 and 41 are spirally directed, rising in a clockwise direction from a point 50 for a distance of approximately 222° to a point 51 (Fig. 3). From the point 51 to a point 53, the upper faces of the ring members 40 and 41 are in a horizontal plane and from the point 51 the upper face of the ring member 39 slopes downwardly to a point 54 and then drops perpendicularly to the plane of the point 50. Likewise, the ring members 40 and 41 at the point 53 drop to the plane of the point 50.

Formed integral with the gear 34, and extending vertically therefrom and arranged to travel in the slot 48, are two diametrically opposite blades 56 which project above the highest point 51 on the inclined upper edges of the ring members 39, 40 and 41 for a suitable distance, the blades serving to advance and feed the screws 49, the shanks of which are in the slot 48, up the spiral track, and to the point 53.

To the upper edge of the offset portion 32 of the screw hopper 30 is secured a cover 57, in which is pivoted, at 60, a spring pressed member 61, the main portion of which depends from the cover into the hopper portion 32. Secured to the member 61, and bearing upon the upper face of the cover 57, is a shouldered disk 62, about which is wound a torsion spring 63 having its opposite ends engaged in suitably arranged apertures 64 and 65 in the disk and the cover, respectively, the tension of the spring constantly urging the pivotal member 61 in a clockwise direction. Formed in the member 61 is an arcuate slot 68 of T-shaped cross-section, along which the screws 49 fed thereto travel in the operation of the apparatus. As shown particularly in Figs. 1, 3, and 10, the member 61 is normally engaged at its left end with the ring members 40 and 41 at the point 53 and its slot 68 is aligned with the slot 48 between the ring members 40 and 41. In this position of the member 61, the upper edge faces of the ring members 40 and 41, upon which the screw heads slide, are in the plane of surfaces 69, upon which the screw heads slide in being advanced through the slot 68 of the member 61.

The ring member 42 is secured in the housing 31 by being clamped between opposed surfaces of the sleeve portion 33 of the housing and a flange 70 of the pipe 18 and is prevented from rotating by a pin 71 carried by the member and engaging in a slot in the sleeve portion. At its upper end, the pipe 18 extends through an aperture in a plate 72 (Figs. 1 and 2), which is clamped at one end to the upper face of a flange 73 on the pipe by a nut 74 threaded onto the end of the pipe and the opposite end of the plate is secured at 75 to the upper edge of the housing 31. Carried by the nut 74 is a bail 78, by means of which the apparatus may be yieldably suspended above the work bench. The hopper 30 is equipped with a main cover 79 pivoted at 80 to the housing 31. A torsion spring 81 serves to normally urge the cover to its closed position, as shown in Figs. 1 and 2. The covers 57 and 79 and the plate 72 serve to completely cover the screw supply hopper.

The motor housing 16 at its lower end carries, by means of a screw threaded connection 82 and a set screw 83, an internally shouldered housing 85, having a right angle arm 86 at its upper end (Fig. 4). Attached by screws 87 (Fig. 2) to the lower surface of the housing arm 86 is a T-shaped bracket 88, which bears, as indicated at 89, against the housing 85. Journalled upon the housing arm 86 and carried in a depression 90, formed in the upper horizontal arm of the bracket 88, are a train of gears 93, 94 and 95. The gear 93 meshes with the clockwise rotating driving pinion 23 and, through the gear 94, the gear 95 is driven counter-clockwise. A shaft 96, to which the gear 95 is secured, extends upwardly and carries, at its upper end, which is journalled in the screw hopper housing 31, a pinion 97 (Fig. 3), which meshes with the gear 34. A stationary tube 100 surrounds the shaft 96 between the housing arm 86 and the hopper housing 31, which strengthens the assemblage, as well as serving as a guard around the rotating shaft. Since the gear 95 and the connected pinion 97 are rotated counter-clockwise, the gear 34 and the attached blades 56 will be driven clockwise. At 101 (Fig. 1) is indicated a pivotal hand control lever carried by the motor housing 16 for actuating a spring pressed valve plunger 103, which, upon being moved inwardly, causes the supply of compressed air connected to the pipe 18 to rotate the motor rotor 22, and thus the screw advancing blades 56, through the described gear drive, and, at the same time, the screw driver blade 27 when the clutch 24 is closed.

The offset portion 32 of the screw hopper housing 31 has formed, in its rear or upper wall, as viewed in Figs. 1 and 3, respectively, a slot 103 of T-shaped cross-section, in which is entered the upper end of a screw magazine runway 104, which is held in a fixed position by the cover 57. At its lower end (Fig. 4), the runway is secured in a suitable slot 105, provided in the vertical arm of the bracket 88 by a shouldered lock screw 108. The runway 104 throughout its length is formed with a slot 109 of T-shaped cross-section and, between its upper and lower secured ends, is given a twist of substantially 90° (Figs. 1 and 2) in order to meet its points of attachment. At its upper end, the runway slot 109 is aligned with the similar shaped slot 68 in the pivotal member 61 for receiving screws therefrom while the member is in its normal position (Fig. 3).

From the above description, and assuming that a quantity of screws 49 have been deposited promiscuously in the hopper 30 and the pneumatic motor 15 is in operation, it will be apparent that as the revolving hopper blades 56 travel around the space 48 between the ring members 40 and 41, the screws will be tumbled about in the hopper. During this tumbling action, screws are continuously being deposited with their shanks in the slot 48 and the bottom surfaces of the heads thereof supported on the upper spirally directed edge faces of the ring members 40 and 41 (Figs. 1 and 3) and, consequently, such screws will be advanced therealong and onto the horizontal portions thereof beginning at the point 51. In the continued movement of the blades 56, any screws correctly arranged on the ring members 40 and 41 will be moved at the point 53 into the aligned T-slot 68 in the pivotal spring pressed member 61, whenever the slot has sufficient space to receive a screw, as the blades move past the member. In case a screw 49 lies horizontally or cross-wise on the upper edges of the ring members 40 and 41, or the slot 68 has no space to receive a screw, such screws will not enter the slot 68 but will fall to the bottom of the hopper as the blade brushes by and swings the pivotal member 61 in a counter-clockwise direction. Thus, only screws which are correctly positioned in the path of the blades 56 will pass into the runway 104 and, consequently, no jamming of the mechanism will occur. As each blade 56 moves by the member 61, it will be rocked about its pivot and, under the tension of the spring 63, will be rocked back to its normal position abutting the ring members 40 and 41 at the point 53. The pivotal member 61 is relieved at 110 (Fig. 3) to permit the rocking thereof. As shown in the drawings (Figs. 1 and 3) only a few screws 49 are shown in the hopper 30 for the sake of simplicity and clearness, but it will be understod that in practice a great number are entered therein and they may be easily replenished as fed into the runway 104.

A gravity actuated stop member 111 (Figs. 3 and 10) is pivoted in the upper wall of the slot 68 in the member 61 in line with the screws 49 being advanced therethrough and the arrangement is such that it is swung upwardly by the movement of the screws therepast and then drops down against the surfaces 69, upon which the bottom surface of the screw heads slide. In this last position the stop member 111 is effective to prevent the screws advanced therepast from being moved backward in the slot 68 and into the hopper when the spring pressed member 61 is returned under spring action to its normal position (Fig. 3), abutting the ring members 40 and 41 at the point 53. Thus the magazine runway 104 is kept constantly filled with a train of screws 49 and the lowermost screw is released at a predetermined period in the operation of the apparatus by means to be described presently.

Referring particularly to Fig. 4, the housing 85 at its cylindrical lower end supports in its bore a cylindrical sleeve portion 116 of a reciprocably mounted irregularly shaped spring pressed foot member 117, the movement of which, in the operation of the apparatus, effects an automatic release of one screw at a time from the runway 104 into alignment with the screw driver blade 27. Fixed to the bracket 88 is a depending rod 118, which, at its lower end, has a sliding fit in an aperture 119 in the foot member 117. The reciprocable movement of the foot member 117 in the housing 85 and on the rod 118 is limited by a cooperating slot 122 in the rod and a lock screw 123 threaded into the foot member. A coiled compression spring 124 surrounds the rod 118 with its opposite ends engaging the bracket 88 and the foot member 117 and normally maintains the foot member in its lowermost position relative to the housing 85 and the rest of the apparatus, as shown in Fig. 4.

The foot member 117 below its sleeve portion 116 is formed with an aligned shouldered bore 125, in which is reciprocably carried a screw holding and steadying sleeve 126, having at its upper end a head 127. Surrounding the screw driver blade 27, which extends through the sleeve 126, is a coiled compression spring 128 having its opposite ends engaging the upper end face of the sleeve head 127 and a collar 130 threaded into the sleeve portion 116 of the foot member 117, the collar also serving as a thrust bearing for the screw driver blade 27. Attached to the left face of the foot member 117 is a leaf spring latch member 131, having at its upper end a latching arm 132, which extends through an opening, indicated at 133, in the wall of the foot member and as shown in Fig. 4 is in its latched position holding the spring pressed sleeve 126 in its upper inoperative position by engaging under the lower annular surface of the sleeve head 127. The lower end surface of the sleeve 126 is inwardly beveled or cupped, as indicated at 136 (Figs. 4 and 8), and when the sleeve is unlatched, by means to be presently described, it springs down and its end face engages a peripheral edge portion of the screw 49, which is supported thereunder, the diameters of the screw head and the sleeve being substantially the same. The purpose of the sleeve 126 is to firmly hold and steady the screw, thus facilitating the alignment thereof with a receiving aperture in the work. The screw was previously released from the magazine runway 104 and moved by gravity into position under the screw driver blade 27, where it was loosely supported until the sleeve engaged it.

The screw holding sleeve 126 is manually unlatched by depressing a rod 137, carrying at its upper end a thumb engaging button 138 (Figs. 1 and 4). The rod 137 is slidably fitted in a tube 139, secured in the arm 86 of the housing 85 and at its lower end carries a laterally extending hook or yoke shaped member 140, which partially surrounds the lower end of the sleeve portion 116 of the foot member 117. A coiled compression spring 143 surrounds the tube 139 and at opposite ends engages the arm 86 of the housing 85 and the lower surface of the button 138 and acts to normally maintain the member 140 in stop position against the lower annular surface of the housing 85 (Fig. 4). Attached to and extending upwardly at an angle from the latch member 131 is an arm 144 which lies in the path of the member 140 and upon the latter being lowered by the operator when depressing the rod 137, the arm 144 will be cammed outwardly and cause a withdrawal of the latching arm 132 from under the head 127 of the screw-holding sleeve 126. The sleeve 126 immediately springs downwardly against the screw head and the latching arm 132 thereafter rides upon the peripheral surface of the sleeve head 127 (Fig. 5) as the member 140 moves upwardly to its normal position upon the operator releasing the button 138.

At its right side (Fig. 4), the foot member 117 is arranged to slide upon a removable filler member 145, which is attached to the vertical arm of the bracket 88 upon its inner surface by a screw 146. The bottom surface of the member 145 is provided with a screw guiding slot, which is aligned with and is a continuation of the slot 109 of the runway 104. A slot 147, similar to and aligned with the slot in the filler member 145, is formed in the foot member 117 and extends at a suitable angle from the filler member to the lower end of the foot member and is centered with the axis of the screw driver blade 27. Removably carried in a slot in the right face of the foot member 117 is a filler member 150, a pin 151 serving to secure the latter in position. A bottom inclined surface of the member 150 extends into the plane of the back face of the slot 147 at its lower end and at its upper end bulges out, as indicated at 152, which produces a camming action on the screws 49 in the screw guiding slot of the member 145 during the operation of the mechanism, which will be described presently.

Secured to opposite sides of the foot member 117 at its extreme lower end are yieldable fingers 153 (Figs. 1, 8 and 9) having inwardly extending lips 154 arranged to receive therebetween a released screw 49 as it falls by gravity down the slot 147. The opposite inner edges of the lips 154 are normally spaced from each other a desired distance and their upper surfaces are formed with shallow curved depressions 157, which are centered with the axis of the screw driver blade 27. The depressions 157 serve as seats for centering the screw as it moves into position under the blade 27, opposite peripheral portions of the screw head resting in the depressions 157.

The operation of the above described apparatus, assuming that the magazine runway 104 is being supplied with screws from the hopper 30 in the manner above described, which, it is believed, needs no further description, is as follows:

Fig. 4 shows the apparatus in an elevated normal position after the driving of a screw and ready to be lowered to drive the screw, which, at this time, is loosely supported on the yieldable fingers 153 with opposite lower peripheral portions of the screw head resting in the finger depressions 157 (Fig. 8). In this position of the apparatus, it will be noted that the train of screws 49 is being held at the cam bulge 152 on the filler member 150, since the spring pressed foot member 117 carrying the filler member is in its extreme lowered position on the apparatus and also that the screw holding sleeve 126 is in its latched position above the screw 49. Previous to the insertion of the screw 49, loosely supported upon the fingers 153, into the apertured screw threaded work indicated at 158 (Fig. 5), the operator who is grasping the motor housing 16 with one hand depresses the spring pressed rod 137 by using his thumb on the button 138 (Fig. 1) and the yoke member 140 at its lower end engages and unlatches the latch member 131 from under the head 127 on the sleeve 126. Thereupon, the sleeve springs down (Fig. 5) and engages upper peripheral portions of the screw head, thus firmly seating the screw in the depression 157 of the fingers 153.

The screw 49 is now firmly supported on the yieldable fingers 153 and the operator then proceeds to lower the apparatus, during which the screw shank is readily centered with the aperture in the work 158 and pressed thereinto, the extreme lower end of the foot member 117, indicated at 160 (Figs. 1 and 8) coming to rest against the upper surface of the work, as shown in Fig. 6. Following the unlatching of the sleeve 126, and upon the engagement of the foot member 117 with the work 158, the operator, by grasping the motor housing 16 tighter, presses the motor control lever 101 to actuate the air control plunger 103, thus causing the motor rotor 22 to rotate. During this movement of the apparatus to the position shown in Fig. 6, the spring pressed screw holding sleeve 126 is moved upwardly relatively to the spring pressed foot member 117 and relatched in the manner previously described by the screw head being pressed upwardly and carrying the sleeve therewith. As the operator continues to press the apparatus downward, the tang of the screw driver blade 27 engages the upper surface of the screw head and this causes the screw driver blade 27 to move upwardly relatively to the spring pressed foot member 117 and the lower clutch member of the clutch 24 operatively engages the rotating upper member thereof. In the rotation of the screw driver blade 27, it is seated in the screw slot and the screw 49 is driven into the screw threaded work 158 (Fig. 7).

In the driving of the screw 49 into the work 158, during which the foot member 117 is held against the work, the train of screws in the runway 104 moves downwardly (Fig. 7) and the leading screw thus moves out of the path of the cam bulge 152, which is retaining the screws from moving out of the runway (Fig. 4). At the same time, the rod 118 is moved into the screw runway or slot 147 in the foot member (Fig. 7). Thus the train of screws 49 is released and moves by gravity down the runway slot, the leading screw stopping against the rod 118. At the termination of the screw driving operation, and before the apparatus is moved upwardly from the work 158, the yieldable fingers 153, which were cammed outwardly from under the screw head during the seating of the screw head against the work are, as shown in Fig. 9, abutting the periphery of the screw head.

Upon the apparatus being raised from its position, as shown in Fig. 7, after the driving of the screw 49 into the work, the spring pressed foot member 117 initially remains against the work and the rest of the apparatus moves upwardly. Thus the rod 118 is moved from its screw holding position across the screw guide runway or slot 147 in the foot member 117 and the screw being held thereby is released and drops by gravity into aligned driving position in the depressions 157 of the yieldable fingers 153. In timed relation to the release of the leading screw 49, the following screw engages the cam bulge 152 on the filler member 150 of the foot member and its movement is checked before it has moved such a distance into the runway slot 147 of the foot member, as shown in Fig. 11, that jamming would occur. Thus, as the apparatus is raised to its upper inoperative position, the cam bulge 152 serves to cause the train of screws to move backward in the runway slot 109 to the position shown in Fig. 4. This completes a cycle of operation of the apparatus, the parts being again in their normal positions ready for the next screw driving operation.

Parts of the apparatus; namely, the ring members 40 and 41, spring pressed member 61, runway 104, spring pressed foot member 117 and filler members 145 and 150 are interchangeable for other parts, thus adapting the apparatus to the feeding and driving of screws of various types and dimensions within certain limits.

It will be understood that when the screw 49 being driven into the work is fully driven into and seated on the work, the toothed slip clutch 24 will release and thus stop further rotation of the screw driver blade 27. Also, the screw feeding hopper blades 56 are operating only when the screw driver blade 27 is being rotated and upon the operator releasing the hand control lever 101, all driven parts of the apparatus cease operation.

From the above description, it is believed that the operation of the apparatus will be fully understood. It is also obvious that the apparatus provides for the automatic delivery of a screw to the driving blade after each operation and thereafter with a minimum of manual manipulation the screw is caused to be first firmly held to facilitate the alignment thereof with the receiving aperture in the work and then driven thereinto.

It will be understood that the specific embodiment of the invention as herein described and illustrated is to be interpreted as merely illustrative and that it is capable of other applications and modifications can be made without departing from the spirit and scope of the appended claims.

What is claimed is:

1. In an apparatus for driving screws, a driving blade, means for rotating said blade, means for supporting a screw in spaced coaxial relation with said blade, means slidable longitudinally of said blade for engaging the end of the screw engaged by said blade, resilient means effective to urge said slidable means to its screw engaging position, means for holding said slidable means in a normal retracted position against the action of said resilient means, and means for releasing said holding means to cause said slidable means to engage and steady the screw upon said supporting means prior to the driving thereof.

2. In an apparatus for driving screws, a driving blade, means for rotating said blade, spaced members for receiving and yieldably supporting a screw delivered thereto in spaced coaxial relation with said blade, means for delivering screws one at a time to said members, means slidable longitudinally of said blade for engaging the end of the screw engaged by said blade, resilient means effective to urge said slidable means to its screw engaging position, means for holding said slidable means in a normal retracted position against the action of said resilient means, and means for releasing said holding means to cause said slidable means to engage and steady the screw upon said supporting members prior to the driving thereof.

3. In an apparatus for driving screws, a driving blade, means for rotating said blade, a housing surrounding said blade, means on said housing for supporting a screw in spaced coaxial relation with said blade, a sleeve of circular cross-section slidable in said housing longitudinally of and surrounding said blade and engageable at one annular end face with the end of the screw engaged by said blade, a latch member on said housing extending through an aperture therein and latchable on a surface of said sleeve for holding the same in a normal retracted position, resilient means effective for moving said sleeve when unlatched into engagement with the screw, and means for unlatching said latch member to permit said sleeve impelled by said resilient means to engage and steady the screw upon said supporting means prior to the driving thereof.

4. In an apparatus for driving screws, a driving blade, means for rotating said blade, a housing movable longitudinally of and surrounding said blade, spaced yieldable members on said housing for supporting a screw in spaced coaxial relation with said blade, a sleeve slidable in said housing longitudinally of and surrounding said blade and engageable at one end face with the end of the screw engaged by said blade, said sleeve at its opposite end having an enlargement providing a shoulder, means carried on said housing movable into engagement with said sleeve shoulder for holding said sleeve in a normal retracted position, resilient means engaging said enlarged sleeve end effective for positively moving said sleeve into engagement with the screw, and means for releasing said holding means to permit said sleeve under the action of said resilient means to engage and steady the screw upon said supporting members prior to the driving thereof, said holding means bearing on the enlarged end of said sleeve while the latter is automatically moved back to its normal position, whereupon the holding means moves into holding engagement with said sleeve shoulder.

5. In an apparatus for driving screws, a driving blade, means for rotating said blade, means for supporting a screw in spaced coaxial relation with said blade, spring backed means slidable longitudinally of said blade for engaging the end of the screw engaged by said blade effective to steady the screw upon said supporting means prior to the driving thereof, said slidable means having a latch engaging surface, a latch member, a support therefor, said latch member being adapted to engage said latch surface on said slidable means to hold the same in a normally retracted position, and means for withdrawing said latch member from said latch surface, said latch member automatically engaging said latch surface upon said slidable means being moved back to its normal position.

GEORGE D. LEA.
JOHN S. STULL.